United States Patent
Devarapalli

(10) Patent No.: US 8,755,267 B2
(45) Date of Patent: Jun. 17, 2014

(54) REDUNDANCY SUPPORT FOR NETWORK ADDRESS TRANSLATION (NAT)

(75) Inventor: Sridhar J. Devarapalli, Sunnyvale, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 714 days.

(21) Appl. No.: 12/759,438

(22) Filed: Apr. 13, 2010

(65) Prior Publication Data

US 2010/0254255 A1 Oct. 7, 2010

Related U.S. Application Data

(60) Continuation of application No. 11/657,981, filed on Jan. 24, 2007, now Pat. No. 7,716,370, which is a division of application No. 10/273,657, filed on Oct. 18, 2002, now Pat. No. 7,647,427.

(51) Int. Cl.
*H04L 12/26* (2006.01)

(52) U.S. Cl.
USPC ............ 370/218; 370/220; 370/221; 370/225

(58) Field of Classification Search
USPC .......... 370/217–221, 389, 400, 225; 713/201; 714/10; 709/238, 245
See application file for complete search history.

(56) References Cited

U.S. PATENT DOCUMENTS

| | | | |
|---|---|---|---|
| 5,473,599 A * | 12/1995 | Li et al. | 370/219 |
| 5,530,872 A | 6/1996 | Smeltzer et al. | |
| 5,835,696 A * | 11/1998 | Hess | 714/10 |
| 6,249,801 B1 | 6/2001 | Zisapel et al. | |
| 6,286,048 B1 | 9/2001 | Moberg | |
| 6,330,605 B1 | 12/2001 | Christensen et al. | |
| 6,337,863 B1 | 1/2002 | Nair et al. | |
| 6,378,068 B1 | 4/2002 | Foster et al. | |
| 6,487,605 B1 | 11/2002 | Leung | |
| 6,578,066 B1 | 6/2003 | Logan et al. | |
| 6,665,702 B1 | 12/2003 | Zisapel et al. | |
| 6,701,368 B1 | 3/2004 | Chennapragada et al. | |
| 6,751,191 B1 * | 6/2004 | Kanekar et al. | 370/217 |
| 6,775,230 B1 | 8/2004 | Watanabe et al. | |
| 6,839,700 B2 | 1/2005 | Doyle et al. | |

(Continued)

OTHER PUBLICATIONS

Foundry Enterprise Configuration and Management Guide, Chapter 13, "Configuring VRRP and VRRPE," copyright 2002; retrieved Sep. 30, 2002, from http://www.foundrynet.com/services/documentation/ecmg/VRRP.html.

(Continued)

*Primary Examiner* — Brian D Nguyen
*Assistant Examiner* — Toan Nguyen
(74) *Attorney, Agent, or Firm* — Novak Druce Connolly Bove + Quigg LLP

(57) ABSTRACT

Stateful failover redundancy support is provided for network address translation (NAT). A master NAT device is backed-up with at least one back-up NAT device. Existing sessions are synchronized between the two NAT devices, such as via a dedicated link between them. In the event of a failover where the master NAT device is unable to perform its NAT functions, ownership of Internet protocol (IP) addresses is transferred from the master NAT device to the back-up NAT device. The back-up NAT device, which is now owner of the IP addresses, assumes the NAT functionality associated with these IP addresses and continues the existing sessions, as well as processing new sessions.

25 Claims, 2 Drawing Sheets

(56) References Cited

U.S. PATENT DOCUMENTS

| | | | |
|---|---|---|---|
| 6,934,292 B1* | 8/2005 | Ammitzboell | 370/400 |
| 6,976,090 B2 | 12/2005 | Ben-Shaul et al. | |
| 6,996,551 B2 | 2/2006 | Hellerstein et al. | |
| 7,006,431 B1 | 2/2006 | Kanekar et al. | |
| 7,042,876 B1* | 5/2006 | Jayasenan et al. | 370/389 |
| 7,061,942 B2 | 6/2006 | Noronha, Jr. et al. | |
| 7,072,332 B2 | 7/2006 | D'Souza | |
| 7,086,061 B1 | 8/2006 | Joshi et al. | |
| 7,139,926 B1 | 11/2006 | Madhav et al. | |
| 7,194,553 B2 | 3/2007 | Lucco et al. | |
| 7,225,236 B1 | 5/2007 | Puthiyandyil et al. | |
| 7,227,872 B1 | 6/2007 | Biswas et al. | |
| 7,254,626 B1 | 8/2007 | Kommula et al. | |
| 7,299,294 B1 | 11/2007 | Bruck et al. | |
| 7,308,503 B2 | 12/2007 | Giraud et al. | |
| 7,380,154 B2 | 5/2008 | Gale et al. | |
| 7,434,088 B2 | 10/2008 | Gale et al. | |
| 7,454,500 B1 | 11/2008 | Hsu et al. | |
| 7,574,508 B1 | 8/2009 | Kommula | |
| 7,581,009 B1 | 8/2009 | Hsu et al. | |
| 7,647,427 B1 | 1/2010 | Devarapalli | |
| 7,657,629 B1 | 2/2010 | Kommula | |
| 7,716,370 B1 | 5/2010 | Devarapalli | |
| 7,899,911 B2 | 3/2011 | Jensen et al. | |
| 8,001,269 B1* | 8/2011 | Satapati et al. | 709/245 |
| 8,024,441 B2 | 9/2011 | Kommula et al. | |
| 2001/0052016 A1 | 12/2001 | Skene et al. | |
| 2002/0049778 A1 | 4/2002 | Bell et al. | |
| 2002/0073337 A1* | 6/2002 | Ioele et al. | 713/201 |
| 2002/0107841 A1 | 8/2002 | Hellerstein et al. | |
| 2002/0156916 A1 | 10/2002 | Watanabe | |
| 2002/0186698 A1 | 12/2002 | Ceniza | |
| 2003/0037165 A1* | 2/2003 | Shinomiya | 709/238 |
| 2003/0074472 A1 | 4/2003 | Lucco et al. | |
| 2003/0177240 A1 | 9/2003 | Gulko et al. | |
| 2004/0255018 A1 | 12/2004 | Taraci | |
| 2006/0120366 A1 | 6/2006 | Jayasenan et al. | |
| 2008/0207200 A1 | 8/2008 | Fein et al. | |
| 2010/0011126 A1 | 1/2010 | Hsu et al. | |
| 2010/0082787 A1 | 4/2010 | Kommula et al. | |
| 2010/0121932 A1 | 5/2010 | Joshi et al. | |
| 2010/0153558 A1 | 6/2010 | Kommula | |
| 2010/0251008 A1 | 9/2010 | Swildens | |
| 2010/0293296 A1 | 11/2010 | Hsu et al. | |

OTHER PUBLICATIONS

Foundry ServerIron® Switch Installation and Configuration Guide, Chapter 7, "Configuring Symmetric SLB and SwitchBack," copyright 2000; retrieved Oct. 7, 2002, from http://www.foundrynet.com/services/documentation/siug/ServerIron_DSR.html.
"Security Solutions" White Paper, Nortel Networks, Nov. 2001.
"End-To-End Security Solutions" White Paper, Nortel Networks, Sep. 2002.
"Optivity Portfolio: Optivity NetID," Nortel Networks, copyright 2002; retrieved Oct. 16, 2002, from http://www.nortelnetworks.com/products/01/optivity/opt_netid/index.html.
"Alteon Web Switching Module: Features & Benefits," Nortel Networks, copyright 2002; retrieved Oct. 17, 2002, from www.nortelnetworks.com/products/01/wsm/fandb.html.
"Implementing High Availability Layer 4 Services Using VRRP and VRRP Extensions," White Paper, Alteon Web Systems, Inc., Oct. 1999.
"OmniSwitch 7000 Series: Carrier-Class Availability for the Enterprise," Alcatel, 2002.
"OmniSwitch 7000 Series: Carrier Class for the Enterprise," Alcatel, Oct. 2002.
"OmniSwitch 8800 Series: Carrier Class for the Enterprise," Alcatel, Oct. 2002.
Office Action, mailed Apr. 6, 2006, for U.S. Appl. No. 10/273,657.
Final Office Action, mailed Apr. 10, 2007, for U.S. Appl. No. 10/273,657.
Office Action, mailed Mar. 7, 2008, for U.S. Appl. No. 10/273,657.
Final Office Action, mailed Nov. 14, 2008, for U.S. Appl. No. 10/273,657.
Notice of Allowability, mailed Sep. 17, 2009, for U.S. Appl. No. 10/273,657.
Office Action, mailed Oct. 7, 2008, for U.S. Appl. No. 11/657,981.
Final Office Action, mailed Jun. 12, 2009, for U.S. Appl. No. 11/657,981.
Notice of Allowability, mailed Dec. 23, 2009, for U.S. Appl. No. 11/657,981.
Office Action, mailed Oct. 4, 2006, for U.S. Appl. No. 10/273,657.
Civil Action 10-332, Complaint for Patent Infringement with Exhibits A-G, filed on Apr. 23, 2010, 131 pages.
Civil Action 10-332, Second Amended and Supplemental Complaint for Patent Infringement with Exhibits H-I, filed on Jul. 16, 2010, 41 pages.
Civil Action CV10-03443, Complaint for Declaratory Judgment with Exhibits A-I, filed on Aug. 6, 2010, 153 pages.
T. Li et al., Cisco Hot Standby Router Protocol (HSRP), RFC-2281, pp. 1-18, Mar. 1998, available at http://tools.ietf.org/pdf/rfc2281.pdf.
Advisory Action, issued in U.S. Appl. No. 11/657,981, mailed Sep. 14, 2009.
Civil Action CV10-03428, Second Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., with Exhibits A-P, filed on Apr. 13, 2011, 238 pages.
Civil Action CV10-03428, Third Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., with Exhibits A-P, filed on Apr. 29, 2011, 42 pages.
Civil Action CV10-03428, Answer to Third Amended Complaint, Affirmative Defenses, and Counterclaims, filed on May 16, 2011, 40 pages.
Civil Action CV10-03428, Answer to Defendant A10 Networks, Inc.'s Counterclaims, and Counterclaim, filed on May 27, 2011, 12 pages.
Request for Reexamination of U.S. Patent No. 7,716,370, filed Jun. 27, 2011, 30 pages.
Request for Reexamination of U.S. Patent No. 7,647,427, filed Jun. 27, 2011, 34 pages.
Ex Parte Reexamination Interview Summary, Reexamination Control No. 90/011,775, mailed Jul. 6, 2011, 1 page.
Notice of Reexamination Request Filing Date and Notice of Assignment of Reexamination Request, Reexamination Control No. 90/011,775, mailed Jul. 6, 2011, 2 pages.
Order Granting Request for Reexamination of U.S. Patent No. 7,647,427, mailed Aug. 26, 2011, Reexamination Control No. 90/011,775, 11 pages.
Office Action, Reexamination Control No. 90/011,775, mailed Feb. 15, 2012, 9 pages.
Ex Parte Reexamination Interview Summary, Reexamination Control No. 90/011,775, mailed Mar. 26, 2012, 8 pages.
Decision on Petition for Extension of Time (Granted), Reexamination Control No. 90/011,775, mailed Mar. 28, 2012, 3 pages.
Order Granting Request for Reexamination of U.S. Patent No. 7,716,370, mailed Aug. 26, 2011, Reexamination Control No. 90/011,773, 11 pages.
Guerney D.H. Hunt et al., "Network Dispatcher: a connection router for scalable Internet services," Computer Networks and ISDN Systems, 1998, at 347-357.
Dave Zwieback, "High Availability Firewall/VPN with VRRP,";login: The Magazine of Usenix & Sage, Dec. 2001, at 41-46.
Martin McClean, Stretching Microsoft Server Clusters with Geo-Dispersion (Updated Apr. 30, 2002), http://technet.microsoft.com/en-us/library/bb742374(d=printer).aspx.

(56) References Cited

OTHER PUBLICATIONS

Civil Action CV10-03428—A10 Networks, Inc.'s Answer to Plaintiffs Brocade Communications Systems, Inc. and Foundry Networks, LLC's Counterclaims, Filed Jun. 17, 2011, 4 pages.
Civil Action CV10-03428—Joint Claim Construction, Filed Aug. 26, 2011, 29 pages.
Civil Action CV10-03428—Notice of Granted Requests for Reexamination of Patents 7,774,833; 7,454,500; 7,899,899; 7,754,965; 7,647,427; and 7,716,370, Filed Sep. 6, 2011, 72 pages, including Exhibits A through F.
Civil Action CV10-03428—Defendant's Invalidity Contentions, Jun. 27, 2011, 143 pages, including Exhibits B and C.
Foundry Networks, Inc., "Foundry ServerIron Installation and Configuration Guide," May 2000, 784 pages.
Civil Action CV10-03428, Expert Report of J. Douglas Tygar in Support of Defendant and Counterclaimant A10 Networks, Inc.'s, and Defendant Lee Chen's and Rajkumar Jalan's Invalidity Contentions, filed Mar. 23, 2012, 81 pages.
Foundry Networks, Inc., "Server Load Balancing in Today's Web-enabled Enterprises," White Paper, pp. 1-10, Apr. 2002.
"Foundry Networks Announces Application Aware Layer 7 Switching on ServerIron Platform," Mar. 1999, 4 pages.
Request for Inter Partes Reexamination of U.S. Patent No. 7,647,427, filed Nov. 4, 2011, 75 pages.
Notice of Reexamination Request Filing Date and Notice of Assignment of Reexamination Request, Reexamination Control No. 95/001,803, mailed Nov. 17, 2011, 2 pages.
Order Granting Request for Inter Partes Reexamination of U.S. Patent No. 7,647,427 and Office Action, mailed Jan. 31, 2012, Reexamination Control No. 95/001,803, 23 pages.
Decision on Petition for Extension of Time (Granted), Reexamination Control No. 95/001,803, mailed Mar. 30, 2012, 3 pages.
Third Party Requester's Comments, Reexamination Control No. 95/001,803, filed May 30, 2012, 17 pages.
Notice of Reexamination Request Filing Date and Notice of Assignment of Reexamination Request, Reexamination Control No. 90/011,773, mailed Jul. 1, 2011, 2 pages.
Ex Parte Reexamination Interview Summary, Reexamination Control No. 90/011,773, mailed Jul. 5, 2011, 3 pages.
Office Action, for Reexamination Control No. 90/011,773, mailed Feb. 15, 2012, 9 pages.
Ex Parte Reexamination Interview Summary, Reexamination Control No. 90/011,773, mailed Mar. 26, 2012, 6 pages.
Decision on Petition for Extension of Time (Granted), Reexamination Control No. 90/011,773, mailed Mar. 28, 2012, 3 pages.
Request for Inter Partes Reexamination of U.S. Patent No. 7,716,370, filed Nov. 4, 2011, 156 pages.
Notice of Reexamination Request Filing Date and Notice of Assignment of Reexamination Request, Reexamination Control No. 95/001,805, mailed Nov. 18, 2011, 2 pages.
Order Granting Request for Inter Partes Reexamination of U.S. Patent No. 7,716,370 and Office Action, mailed Jan. 31, 2012, Reexamination Control No. 95/001,805, 24 pages.
Decision on Petition for Extension of Time (Granted), Reexamination Control No. 95/001,805, mailed Mar. 30, 2012, 3 pages.
Third Party Requester's Comments, Reexamination Control No. 95/001,805, filed May 30, 2012, 18 pages.
Civil Action CV10-03428, Order Construing Disputed Claim Terms of U.S. Patent Nos. 7,647,427; 7,716,370; 7,558,195; 7,454,500; 7,581,009; 7,657,629; 7,584,301; 7,840,678; and 5,875,185, issued Jan. 6, 2012, 33 pages.
Final Office Action, for Reexamination Control No. 90/011,773, mailed Jun. 27, 2012, 15 pages.
Final Office Action, Reexamination Control No. 90/011,775, mailed Jun. 27, 2012, 18 pages.
Civil Action 10-332—*Brocade Communication Systems, Inc.* v. *A10 Networks, Inc.*—Civil Cover Sheet, filed on Apr. 23, 2010, 1 page.
Civil Action—Case No. CV10-03443—Complaint for Declaratory Judgment, filed on Aug. 6, 2010, with Exhibits A through I, 153 pages.
Civil Action—Case No. CV10-03443—Notice of Voluntary Dismissal Without Prejudice, filed on Aug. 16, 2010, 2 pages.
Civil Action—CV10-03428—Order Reassigning Case. Case reassigned to Judge Hon. Lucy H. Koh for all further proceedings. Judge Magistrate Judge Elizabeth D. Laporte no longer assigned to the case, filed Aug. 16, 2010, 1 page.
Civil Action—CV10-03428—Motion to Dismiss Complaint filed by A10 Networks, Inc., Lee Chen, Rajkumar Jalan, Ron Szeto, filed Oct. 11, 2010, 30 pages.
Civil Action CV10-03428—Defendant, David Cheung's Answer to Plaintiff's First Amended Complaint, filed Nov. 11, 2010, 32 pages.
Civil Action CV10-03428—Notice of Motion and Motion to Dismiss First Amended Complaint filed by A10 Networks, Inc., Lee Chen, Rajkumar Jalan, Ron Szeto, filed Nov. 12, 2010, 34 pages.
Civil Action CV10-03428—Declaration of Scott R. Mosko in Support of Motion to Dismiss First Amended Complaint, filed by A10 Networks, Inc., Lee Chen, Rajkumar Jalan, Ron Szeto, filed Nov. 12, 2010, 56 pages. Included: Exhibits A and B.
Civil Action CV10-03428—Memorandum in Opposition re Motion to Dismiss First Amended Complaint, filed by Brocade Communications Systems, Inc., Foundry Networks, LLC, filed Jan. 27, 2011, 33 pages.
Civil Action CV10-03428—Reply to Opposition re Motion to Dismiss First Amended Complaint, filed by A10 Networks, Inc., Lee Chen, Liang Han, Steve Hwang, Rajkumar Jalan, Ron Szeto, filed Feb. 3, 2011, 20 pages.
Civil Action CV10-03428—Order by Judge Lucy H. Koh granting in part and denying in part Motion to Dismiss First Amended Complaint, filed Mar. 23, 2011, 19 pages.
Civil Action CV10-03428—Motion to Stay Defendants' Motion to Stay Proceedings Pending Reexaminations filed by A10 Networks, Inc., Lee Chen, Liang Han, Steve Hwang, Rajkumar Jalan, Ron Szeto, filed Jul. 1, 2011, 26 pages. Included: Affidavit Declaration of Scott R. Mosko in Support of Motion; Proposed Order, Exhibits 1 and 2.
Civil Action CV10-03428—Opposition to Motion to Stay Proceedings Pending Reexaminations, filed by Brocade Communications Systems, Inc., Foundry Networks, LLC, filed Jul. 15, 2011, 20 pages. Included: Proposed Order.
Civil Action CV10-03428—Declaration of Siddhartha M. Venkatesan in Support of Opposition/Response to Motion, Plaintiffs' Opposition to Defendants' Motion to Stay Proceedings, filed by Brocade Communications Systems, Inc., Foundry Networks, LLC, filed Jul. 15, 2011, 70 pages. Included: Exhibits A through E.
Civil Action CV10-03428—Reply to Plaintiffs' Opposition to Defendants' Motion to Stay Proceedings Pending Reexaminations, filed by A10 Networks, Inc., filed Jul. 22, 2011, 34 pages. Included: Declaration of Scott R. Mosko, Exhibits A, C, and D.
Civil Action CV10-03428—Memorandum in Support of Motion for Temporary Restraining Order and Preliminary Injunction [Redacted Version] filed by Brocade Communications Systems, Inc., Foundry Networks, LLC, filed Jul. 26, 2011, 34 pages. Included: Proposed Order for Temporary Restraining Order and Order to Show Cause and Proposed Preliminary Injunction.
Civil Action CV10-03428—Declaration of Andrew (Andy) Guerrero in Support of Motion for Temporary Restraining Order [Redacted Version] of Plaintiffs' Memorandum In Support Of Motion For Temporary Restraining Order And Preliminary Injunction [Redacted Version] of Andrew (Andy) Guerrero ISO Plaintiffs' Motion For TRO and Preliminary Injunction filed by Brocade Communications Systems, Inc., Foundry Networks, LLC, filed Jul. 26, 2011, 3 pages.
Civil Action CV10-03428—Declaration of Fabio E. Marino in Support of Motion for Temporary Restraining Order [Redacted Version] of Plaintiffs' Memorandum In Support Of Motion For Temporary Restraining Order And Preliminary Injunction [Redacted Version] of Declaration of Fabio E. Marino ISO Plaintiffs' Motion For TRO and Preliminary Injunction filed by Brocade Communications Systems, Inc., Foundry Networks, LLC, filed Jul. 26, 2011, 2 pages.
Civil Action CV10-03428—Declaration of Keith Stewart in Support of Motion for Temporary Restraining Order [Redacted Version] of Plaintiffs' Memorandum In Support Of Motion For Temporary Restraining Order And Preliminary Injunction [Redacted Version] of Declaration of Fabio E. Marino ISO Plaintiffs' Motion For TRO and

(56) References Cited

OTHER PUBLICATIONS

Preliminary Injunction filed by Brocade Communications Systems, Inc., Foundry Networks, LLC, filed Jul. 26, 2011, 5 pages.

Civil Action CV10-03428—Declaration of Mani Prasad Kancherla in Support of Motion for Temporary Restraining Order [Redacted Version] of Plaintiffs' Memorandum In Support Of Motion For Temporary Restraining Order And Preliminary Injunction [Redacted Version] of Declaration of Fabio E. Marino ISO Plaintiffs' Motion For TRO and Preliminary Injunction filed by Brocade Communications Systems, Inc., Foundry Networks, LLC, filed Jul. 26, 2011, 5 pages.

Civil Action CV10-03428—Declaration of Prasad Aluri in Support of Motion for Temporary Restraining Order [Redacted Version] of Plaintiffs' Memorandum In Support Of Motion For Temporary Restraining Order And Preliminary Injunction [Redacted Version] of Declaration of Fabio E. Marino ISO Plaintiffs' Motion For TRO and Preliminary Injunction filed by Brocade Communications Systems, Inc., Foundry Networks, LLC, filed Jul. 26, 2011, 3 pages.

Civil Action CV10-03428—Declaration of Robert D. Young in Support of Motion for Temporary Restraining Order [Redacted Version] of Plaintiffs' Memorandum In Support Of Motion For Temporary Restraining Order And Preliminary Injunction [Redacted Version] of Declaration of Fabio E. Marino ISO Plaintiffs' Motion For TRO and Preliminary Injunction filed by Brocade Communications Systems, Inc., Foundry Networks, LLC, filed Jul. 26, 2011, 46 pages. Included: Redacted Exhibits 1 through 8.

Civil Action CV10-03428—Declaration of Lisa McGill in Support of Motion for Temporary Restraining Order [Redacted Version] of Plaintiffs' Memorandum In Support Of Motion For Temporary Restraining Order And Preliminary Injunction [Redacted Version] of Declaration of Fabio E. Marino ISO Plaintiffs' Motion For TRO and Preliminary Injunction filed by Brocade Communications Systems, Inc., Foundry Networks, LLC, filed Jul. 26, 2011, 506 pages. Included: Exhibits 1 through 30. (due to size, this references will be submitted in three parts).

Civil Action CV10-03428—Plaintiffs' Reply Memorandum In Further Support Of Motion For Temporary Restraining Order And Preliminary Injunction[Redacted Version] filed by Brocade Communications Systems, Inc., Foundry Networks, LLC, filed Aug. 4, 2011, 22 pages.

Civil Action CV10-03428—Notice of Errata re Reply Memorandum in Further Support of Motion for Temporary Restraining Order and Preliminary Injunction, filed by Brocade Communications Systems, Inc., Foundry Networks, LLC, filed Aug. 5, 2011, 2 pages.

Civil Action CV10-03428—Order by Judge Lucy H. Koh denying Motion to Stay; finding as moot Motion to Compel; denying Motion to Qualify Expert Kevin Jeffay Under the Protective Order; granting in part and denying in part Motion for Sanctions; granting Motion to Order A10 to File Confidential Information Under Seal; granting Motion for Leave to File Supplemental Authority, filed Aug. 12, 2011, 2 pages.

Civil Action CV10-03428—Order Denying Motion for Temporary Restraining Order [Redacted Version] of Plaintiffs' Memorandum In Support Of Motion For Temporary Restraining Order And Preliminary Injunction, filed by Brocade Communications Systems, Inc., Foundry Networks, LLC, filed Aug. 16, 2011, 5 pages.

Civil Action CV10-03428—Notice of Granted Request for Reexamination of U.S. Patent No. 7,581,009, filed Sep. 27, 2011, 18 pages.

Civil Action CV10-03428—Redacted Declaration of David Klausner in Support of Opposition to Plaintiffs' Motion for Temporary Restraining Order and Preliminary Injunction, by A10 Networks, Inc., filed Sep. 28, 2011, 9 pages.

Civil Action CV10-03428—Redacted Declaration of Dr. Chi Zhang in Support of Opposition to Plaintiffs' Motion for Temporary Restraining Order and Preliminary Injunction, filed by A10 Networks, Inc., filed Sep. 28, 2011, 4 pages.

Civil Action CV10-03428—Notice of Motion for Partial Summary Judgment on Assignor Estoppel, filed by Brocade Communications Systems, Inc., Foundry Networks, LLC, filed Oct. 11, 2011, 21 pages.

Civil Action CV10-03428—Declaration of Teri H.P. Nguyen in Support of Motion for Partial Summary Judgment Notice of Motion and Motion for Partial Summary Judgment on Assignor Estoppel, filed by Brocade Communications Systems, Inc., Foundry Networks, LLC, filed Oct. 11, 2011, 259 pages. Included: Exhibits A through R.

Civil Action CV10-03428—Initial Claim Construction Brief, filed by Brocade Communications Systems, Inc., Foundry Networks, LLC, filed Oct. 11, 2011, 31 pages.

Civil Action CV10-03428—Declaration of Nitin Gambhir of Brocade Communications Systems, Inc. and Foundry Networks, LLC's Motion for Summary Judgment of Infringement of U.S. Patent Nos. 7,454,500; 7,581,009; 7,657,629; 7,584,301; 7,840,678; 7,716,370; 7,647,427; and 7,558,195 filed by Brocade Communications Systems, Inc., Foundry Networks, LLC., filed Oct. 11, 2011, 251 pages. Included: Exhibits A through H and Proposed Order.

Civil Action CV10-03428—Administrative Motion to File Under Seal Brocade Communications Systems, Inc. and Foundry Networks, LLC's Administrative Motion for Leave to File Under Seal Notice of Errata and Submission of Corrected Brief, filed by Brocade Communications Systems, Inc., Foundry Networks, LLC, filed Oct. 13, 2011, 8 pages. Included: Proposed Order and Declaration.

Civil Action CV10-03428—Order by Judge Lucy H. Koh denying Motion for Leave to File Excess Pages and Striking Plaintiffs' Motion for Summary Judgment on Infringement, filed Oct. 18, 2011, 2 pages.

Civil Action CV10-03428—Declaration of Nitin Gambhir in Support of Brocade Communications, Inc. and Foundry Networks, LLCs Motion for Summary Judgment of Infringement of U.S. Patent Nos. 7,454,500; 7,581,009; 7,657,629; 7,584,301; and 7,840,678, filed by Brocade Communications Systems, Inc., Foundry Networks, LLC, filed Oct. 21, 2011, 162 pages.

Civil Action CV10-03428—Opposition re Motion for Partial Summary Judgment on Assignor Estoppel Defendant and Counterclaimant A10 Networks, Inc.'s, and Defendants Lee Chen's, Rajkumar Jalan's, and Ron Szeto's Opposition to Plaintiffs Brocade Communications Systems, Inc.'s and Foundry Networks, LLC's Motion for Partial Summary Judgment on Assignor Estoppel, filed by A10 Networks, Inc., Lee Chen, Rajkumar Jalan, Ron Szeto, filed Nov. 8, 2011, 17 pages.

Civil Action CV10-03428—Responsive Claim-Construction Brief (PLR 4-5(b)) by A10 Networks, Inc., Lee Chen, Rajkumar Jalan, filed Nov. 15, 2011, 28 pages.

Civil Action CV10-03428—Declaration of Scott R. Mosko in Support of Defendant and Counterclaimant A10 Networks, Inc.'s and Defendants Lee Chen's and Rajkumar Jalan's Responsive Claim Construction Brief (PLR 4-5(b)) filed by A10 Networks, Inc., Lee Chen, Rajkumar Jalan, filed Nov. 15, 2011, 70 pages. Included: Exhibits A through F.

Civil Action CV10-03428—Declaration of J. Douglas Tygar, Ph.D. in Support of Defendant and Counterclaimant A10 Networks, Inc.'s and Defendants Lee Chen's and Rajkumar Jalan's Responsive Claim Construction Brief (PLR 4-5(b)) filed by A10 Networks, Inc., Lee Chen, Rajkumar Jalan, filed on Nov. 15, 2011, 77 pages.

Civil Action CV10-03428—Opposition re Motion for Summary Judgment Of Noninfringement of U.S. Patent No. 5,875,185; Motion for Partial Summary Judgment of U.S. Patent Nos. 7,454,500; 7,581,009; 7,657,629; 7,584,301; and 7,840,678, filed by A10 Networks, Inc., Lee Chen, Rajkumar Jalan, filed Nov. 15, 2011, 20 pages.

Civil Action CV10-03428—Declaration of Scott R. Mosko in Support of Defendant and Counterclaimant A10 Networks, Inc.s, and Defendants Lee Chens And Rajkumar Jalans Opposition to Plaintiffs Brocade Communications, Inc. and Foundry Networks, LLCs Motion for Partial Summary Judgment of U.S. Patent Nos. 7,454,500; 7,581,009; 7,657,629; 7,584,301; and 7,840,678 filed by A10 Networks, Inc., Lee Chen, Rajkumar Jalan, filed Nov. 15, 2011, 16 pages.

Civil Action CV10-03428—Administrative Motion to Consider Whether Cases Should be Related, filed by Brocade Communications Systems, Inc., Foundry Networks, LLC, filed Nov. 21, 2011, 8 pages. Included: Declaration and Proposed Order.

Civil Action CV10-03428—Reply Claim Construction Brief filed by Brocade Communications Systems, Inc., Foundry Networks, LLC, filed Nov. 22, 2011, 22 pages.

(56) References Cited

OTHER PUBLICATIONS

Civil Action CV10-03428—Declaration of Nitin Gambhir in Support of Reply Claim Construction Brief, filed by Brocade Communications Systems, Inc., Foundry Networks, LLC, filed Nov. 22, 2011, 12 pages. Included: Exhibit A.

Civil Action CV10-03428—Motion to Stay Defendant and Counterclaimant A10 Networks, Inc.'s and Defendants Lee Chen's Rajkumar Jalan's, Ron Szeto's and Steve Hwang's Renewed Motion to Stay All Proceedings Pending Inter Partes Reexamination (All Patents Asserted by Plaintiffs) filed by A10 Networks, Inc., Lee Chen, Steve Hwang, Rajkumar Jalan, Ron Szeto, filed Nov. 23, 2011, 15 pages. Included: Proposed Order.

Civil Action CV10-03428—Declaration of Scott A. Herbst Declaration of Scott A. Herbst In Support of Defendant and Counterclaimant A10 Networks, Inc.s and Defendants Lee Chens, Rajkumar Jalans, Ron Szetos, and Steve Hwangs Renewed Motion To Stay All Proceedings Pending Inter Partes Reexamination (All Patents Asserted By Plaintiffs) filed byA10 Networks, Inc., Lee Chen, Steve Hwang, Rajkumar Jalan, Ron Szeto, filed Nov. 23, 2011, 25 pages. Included: Exhibits 1 through 6.

Civil Action CV10-03428—Litigation Docket, printed on Nov. 26, 2011, 2011, 44 pages.

Civil Action CV10-03428—Stipulation Regarding Plaintiffs' Motion for Partial Summary Judgment of Assignor Estoppel, filed Nov. 30, 2011, 2 pages.

Civil Action CV10-03428—Brocade's Opposition to Defendant's Motion to Stay Proceedings Pending Reexaminations, filed Dec. 7, 2011, 18 pages.

Civil Action CV10-03428—Defendant and Counterclaimant A10 Networks, Inc.'s and Defendants Lee Chen's, Rajkumar Jalan's, Ron Szeto's, and Steve Hwang's Reply in Support of its Renewed Motion to Stay Proceedings Pending Inter Partes Reexaminations (All Patents Asserted by Plaintiffs), Filed Dec. 14, 2011, 11 pages.

Civil Action CV10-03428—Defendant and Counterclaimant A10 Networks, Inc.'s Notice of Granted Requests for Inter Partes Reexamination of Plaintiffs' U.S. Patent Nos. 7,558,195; 7,454,500; 7,574,508; and 7,720,977, filed Dec. 28, 2011, 3 pages.

Civil Action CV10-03428—Defendant and Counterclaimant A10 Networks, Inc.'s Notice of Granted Request for Inter Partes Reexamination of Plaintiffs' U.S. Patent No. 7,581,301, filed Dec. 29, 2011, 3 pages.

Civil Action CV10-03428—Defendant and Counterclaimant A10 Networks, Inc.'s Notice of Granted Request for Inter Partes Reexamination of Plaintiffs' U.S. Patent Nos. 7,657,629 and 7,840,678, filed Jan. 20, 2012, 3 pages.

Civil Action CV10-03428—Defendant and Counterclaimant A10 Networks, Inc.'s Notice regarding Inter Partes Reexaminations of Plaintiffs' Asserted Patents: (i) Four Newly-Granted Requests (U.S. Patent Nos. 7,774,833; 7,647,427; 7,716,370; 7,581,009); and (ii) Status Updated for Eleven Already-Instituted Reexaminations (U.S. Patent Nos. 7,774,833; 7,647,427; 7,716,370; 7,581,009; 7,657,629; 7,840,678; 7,584,301; 7,558,195; 7,454,500; 7,720,977; and 7,574,508), filed Feb. 6, 2012, 3 pages.

Civil Action CV10-03428—Defendant and Counterclaimant A10 Networks, Inc.'s Notice of Granted Request for Inter Partes Reexamination of Plaintiffs' U.S. Patent No. 7,756,965 and Status Update, filed Feb. 16, 2012, 3 pages.

Civil Action CV10-03428—Defendant and Counterclaimant A10 Networks, Inc.'s Notice of Requests for Reexaminations Granted re Patents 7,558,195; 7,657,629; and 7,840,678, filed Aug. 5, 2011, 3 pages.

Civil Action CV10-03428—Defendant and Counterclaimant A10 Networks, Inc.'s Notice of Granted Requests for Reexamination of Patent 7,584,301, filed Aug. 12, 2011, 3 pages.

Civil Action CV10-03428—Defendant and Counterclaimant A10 Networks, Inc.'s Motion for Summary Judgment of Noninfringement of U.S. Patent Nos. 7,647,427 and 7,716,370, filed Oct. 11, 2011, 14 pages.

Civil Action CV10-03428—Declaration of John Chiong in Support of Defendant and Counterclaim-Plaintiff A10 Networks, Inc.'s and Defendants Lee Chen's and Rajkumar Jalan's Motion for Summary Judgment of Noninfringement of U.S. Patent Nos. 7,647,427 and 7,716,370, filed Oct. 11, 2011, 3 pages.

Civil Action CV10-03428—Declaration of Scott A. Herbst in Support of Defendant and Counterclaim-Plaintiff A10 Networks, Inc.'s and Defendants Lee Chen's and Rajkumar Jalan's Motion for Summary Judgment of Noninfringement of U.S. Patent Nos. 7,647,427 and 7,716,370, filed Oct. 11, 2011, 3 pages.

Civil Action CV10-03428—Declaration of Nitin Gambhir In Support of Brocade Communications Systems, Inc.'s and Foundry Networks, LLC's (1) Motion for Partial Summary Judgment of Infringement of U.S. Patent Nos. 7,647,427 and 7,716,370 [Filed Under Seal]; (2) Opposition to Defendants' Motion for Summary Judgment of Non-Infringement of U.S. Patent Nos. 7,647,427 and 7,716,370 [Filed Under Seal]; and (3) Opposition to Defendants' Motion for Summary Judgment of Non-Infringement of U.S. Patent No. 7,558,195 [Filed Under Seal], filed Nov. 8, 2011, 153 pages.

Civil Action CV10-03428—Defendant and Counterclaimant A10 Networks, Inc.'s Reply in Support of Motion for Summary Judgment of U.S. Patent Nos. 7,647,427 and 7,716,370, filed Nov. 22, 2011, 17 pages.

Civil Action CV10-03428—Declaration of Siddhartha M. Venkatesan in Support of Opposition to Motion to Stay Proceedings Pending Reexaminations, filed Dec. 7, 2011, 3 pages.

Civil Action CV10-03428—Declaration of Azer Bestavros in Support of Brocade's Claim Construction Brief, filed Oct. 20, 2011, 24 pages.

Civil Action CV10-03428—Declaration of Izhak Rubin in Support of Brocade Communications Systems, Inc.'s and Foundry Networks, LLC's: (1) Claim Construction Brief; (2) Opposition to Defendants' Motion for Summary Judgment of Non-Infringement of U.S. Patent Nos. 7,647,427 and 7,716,370; and (3) Opposition to Defendants' Motion for Summary Judgment of Non-Infringement of U.S. Patent No. 7,558,195, filed Nov. 18, 2011, 34 pages.

Civil Action CV10-03428—Order by Judge Lucy H. Koh Denying A10's Motion for Summary Judgment of NonInfringement; Granting Brocade's Motion for Summary Judgment of NonInfringement, issued Jan. 6, 2012, 20 pages.

Civil Action CV10-03428—A10 Networks, Inc.'s Motion for Leave to File "Notice of Activity Before the Patent Office from the Ongoing Inter Partes and Ex parte Reexaminations of the Asserted Brocade Patents" and Proposed Order, filed Mar. 12, 2012, 10 pages.

Civil Action CV10-03428—Declaration of Scott A. Herbst in Support of A10 Networks, Inc.'s Administrative Motion for Leave to File Notice of Activity Before the Patent Office from the Ongoing Inter Partes and Ex Parte Reexaminations of the Asserted Brocade Patents and Proposed Order, filed Apr. 12, 2012, 70 pages.

Civil Action CV10-03428—Order by Hon. Lucy H. Koh granting Motion for Leave to File "Notice of Acticity Before the Patent Office From the Ongoing Inter Partes and Ex Parte Reexaminations of the Asserted Brocade Patents," issued Mar. 15, 2012, 5 pages.

Civil Action CV10-03428—Declaration of Scott R. Mosko in Support of Defendants A10 Networks, Inc.'s, Lee Chen's, Rajkumar Jalan's, Ron Szeto's and Steve Hwang's Motion for Summary Judgment, filed Apr. 13, 2012, 223 pages.

Civil Action CV10-03428—Declaration of Teri H.P. Nguyen in Support of Plaintiffs' Motion for Partial Summary Judgment Dismissing Invalidity Declaratory Relief Counterclaim and Invalidity Affirmative Defense Regarding U.S. Patent Nos. 7,454,500; 7,581,009; 7,55,195; and 7,774,833, filed May 3, 2012, 23 pages.

Civil Action CV10-03428—Exhibit 17 to Declaration of Scott R. Mosko in Support of Defendants A10 Networks, Inc.'s, Lee Chen's, Rajkumar Jalan's, Ron Szeto's and Steve Hwang's Motion for Summary Judgment, filed May 4, 2012, 25 pages.

Civil Action CV10-03428—Amended Declaration of Scott R. Mosko in Support of Defendants A10 Networks, Inc.'s, Lee Chen's, Rajkumar Jalan's, Ron Szeto's and Steve Hwang's Motion for Summary Judgment, filed May 7, 2012, 5 pages.

Civil Action CV10-03428—Defendant and Counterclaimant A10 Networks, Inc.'s Notice of Activity in the Ongoing inter partes and ex parte Reexaminations of the Asserted Brocade Patents, filed May 11, 2012, 5 pages.

(56) References Cited

OTHER PUBLICATIONS

Civil Action CV10-03428—Plaintiff's Objections to Declarations Submitted by A10 Networks, Inc., Lee Chen, Rajkumar Jalan, Ron Szeto and Steve Hwang in Support of Their Motion For Partial Summary Judgment, filed May 17, 2012, 3 pages.

Civil Action CV10-03428—Declaration of Elizabeth C. McBride in Support of Plaintiffs Brocade Communications Systems, Inc.'s and Foundry Networks, LLC's Opposition to Defendants' Motion for Summary Judgment, filed May 17, 2012, 135 pages.

Civil Action CV10-03428—Declaration of Gary Hemminger In Support of Brocade Communications Systems, Inc.'s and Foundry Networks, LLC's Opposition to Defendants A10 Networks, Inc.'s, Lee Chen's, Rajkumar Jalan's, Ron Szeto's and Steve Hwang's Motion For Summary Judgment, filed May 17, 2012, 3 pages.

Civil Action CV10-03428—Defendants A10 Networks, Inc.'s, Lee Chen's, Rajkumar Jalan's, Ron Szeto's and Steve Hwang's Opposition to Plaintiff's Motion for Partial Summary Judgment Dismissing Invalidity Declaratory Relief Counterclaim and Invalidity Defense Regarding U.S. Patent Nos. 7,454,500; 7,581,009; 7,558,195; and 7,774,833, filed May 17, 2012, 30 pages.

Civil Action CV10-03428—Declaration of Scott R. Mosko in Support of Defendants A10 Networks, Inc.'s, Lee Chen's, Rajkumar Jalan's, Ron Szeto's and Steve Hwang's Opposition to Plaintiff's Motion for Partial Summary Judgment Dismissing Invalidity Declaratory Relief Counterclaim and Invalidity Defense Regarding U.S. Patent Nos. 7,454,500; 7,581,009; 7,558,195; and 7,774,833, filed May 17, 2012, 13 pages.

Civil Action CV10-03428—Order Granting in Part and Denying in Part A10's Motion for Summary Judgment, Jun. 12, 2012, 36 pages.

Civil Action CV10-03428—Order Granting Plaintiffs' Motion for Partial Summary Judgment Dismissing Invalidity Declaratory Relief Counterclaim and Invalidity Affirmative Defense Regarding U.S. Patent Nos. 7,454,500; 7,581,009; 7,558,195; and 7,774,833, Jun. 18, 2012; 20 pages.

Civil Action CV10-03428—Defendant and Counterclaimant A10 Network, Inc.'s Amended Supplemental Claim Construction Brief, filed Jun. 30, 2012, 9 pages.

Civil Action CV10-03428—Plaintiff's Supplemental Claim Construction Brief, with Declarations of Azer Bestravros and Izhak Rubin, filed Jul. 3, 2012, 15 pages.

Civil Action CV10-03428—Further Claim Construction Order, Jul. 5, 2012, 4 pages.

Advisory Action, Reexamination Control No. 90/011,775, mailed Sep. 18, 2012, 22 pages.

Action Closing Prosecution, Reexamination Control No. 95/001,803, mailed Aug. 30, 2012, 39 pages.

Advisory Action, Reexamination Control No. 90/011,773, mailed Sep. 18, 2012, 23 pages.

Action Closing Prosecution, Reexamination Control No. 95/001,805, mailed Aug. 30, 2012, 29 pages.

Bourke, Tony, "Server Load Balancing", Server Load Balancing, 2001, O'Reilly & Associates, Inc., Published by O'Reilly & Associates Inc., 101 Morris Street, Sebastopol CA 95472, Printed Aug. 2001, First Edition, 182 pages.

Hasenstein, Michael, "IP Address Translation", http://www.csn.tu-chemnitz.de/HyperNews/get/linux-ip-nat.html, 1997, 50 pages.

Hasenstein, Michael, "Linux IP Network Address Translation", http://web.archive.org/web/20031209024748/http://www.hasenstein.com/HyperNews/get/linux-tp-nat.html, Dec. 2003, 12 pages.

Zhou, Tao, "Web Server Load Balancers", http://windowsitpro.com/print/networking/web-server-load-balancers, Feb. 29, 2000, 7 pages.

Civil Action 10-332, Report on the Filing or Determination of an Action Regarding a Patent or Trademark, filed on Aug. 5, 2010, 2 pages.

Civil Action 10-332, Notice of Voluntary Dismissal Without Prejudice, filed on Aug. 5, 2010, 2 pages.

Civil Action CV10-03428, Complaint for Patent Infringement, Trade Secret Misappropriation, Breach of Contract, Interference with Prospective Economic Advantage, Interference with Contract, and Unfair Competition Under Cal. Bus. & Prof. Code §§ 17200 et seq., filed on Aug. 4, 2010, with Exhibits A-M, 196 pages.

Civil Action CV10-03428, First Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Oct. 29, 2010, 38 pages.

* cited by examiner

REDUNDANCY SUPPORT FOR NETWORK ADDRESS TRANSLATION (NAT)

CROSS-REFERENCE TO RELATED APPLICATIONS

This application is continuation of and claims priority under 35 U.S.C. §120 to U.S. patent application Ser. No. 11/657,981, entitled "REDUNDANCY SUPPORT FOR NETWORK ADDRESS TRANSLATION (NAT)," filed Jan. 24, 2007, now issued as U.S. Pat. No. 7,716,370, which in turn is a divisional of U.S. patent application Ser. No. 10/273,657, entitled "REDUNDANCY SUPPORT FOR NETWORK ADDRESS TRANSLATION (NAT)," filed Oct. 18, 2002, now issued as U.S. Pat. No. 7,647,427, assigned to the same assignee as the present application, and incorporated herein by reference in their entireties.

BACKGROUND OF THE INVENTION

1. Field of the Invention

This disclosure relates generally to providing redundancy support for network devices. More particularly but not exclusively, the present disclosure relates to providing redundancy support for network address translation (NAT) devices (such as routers or switches) in the event of a failover.

2. Description of the Related Art

Network address translation (NAT) is the translation of an Internet Protocol (IP) address used within one network to a different IP address known within another network. One network is designated as the inside network and the other network is designated as the outside network.

Generally, a company maps its local inside network addresses to one or more global outside IP addresses, and unmaps the global IP addresses on incoming packets back into local IP addresses. This provides a form of security since each outgoing or incoming request must go through a translation process that also offers the opportunity to qualify or authenticate the request or to match it to previous request. Furthermore, the translation processes provides added security in that the internal local IP addresses are kept hidden from outsiders. NAT also conserves on the number of global IP addresses that a company needs, and lets the company use a single (or a few) global IP address in its communication with outsiders.

NAT is typically included as part of a router or other network device, which in turn may form part of a firewall. System administrators create NAT tables that perform the global-to-local and local-to-global IP address mapping. NAT can be statically defined or can be configured to dynamically translate to and from a pool of IP addresses.

Despite the advantages provided by NAT, it nevertheless is prone to problems that typically plague networks. For example, failure (which may be caused by power outages, device malfunction, viruses, etc.) will always occur despite system administrators' best efforts to guard against them. When a failure occurs, NAT is unable to perform address translation and to forward traffic. This down time will continue until the current NAT device (or some other network device that caused the failover) is repaired to bring it back online. In situations where the network may have a backup NAT device, the backup NAT device can be brought online to allow new network traffic to resume—unfortunately, there will still be some downtime and lost traffic (from current connections that were broken at the time of the failover) between the time that the failover occurs and the time that the backup NAT device is brought online.

Failure can also affect transparent cache switching (TCS) functionality. With TCS, commonly accessed web pages are cached so that the requesting client need not access the Internet each time a commonly accessed web page is desired. Instead, the client can access the cached version, thereby reducing latency and bandwidth usage associated with connecting to the Internet. In the event of a failover, the TCS device(s) are unable to provide the client with access to the cache, thus forcing the client to connect to the Internet, if such a connection is even available during the failover. Thus, with TCS systems, a failover can cause latency, downtime, and lost traffic as well.

BRIEF SUMMARY OF THE INVENTION

One aspect of the present invention provides a method for redundancy support. The method includes at a first device, conducting a session related to at least one address from among a plurality of addresses owned by the first device. Session information associated with the conducted session is sent from the first device to a second device. If a failure is detected, the method transfers ownership of the plurality of addresses from the first device to the second device and continues any currently conducted session, corresponding to the session information, at the second device.

DETAILED DESCRIPTION

Figure 1:
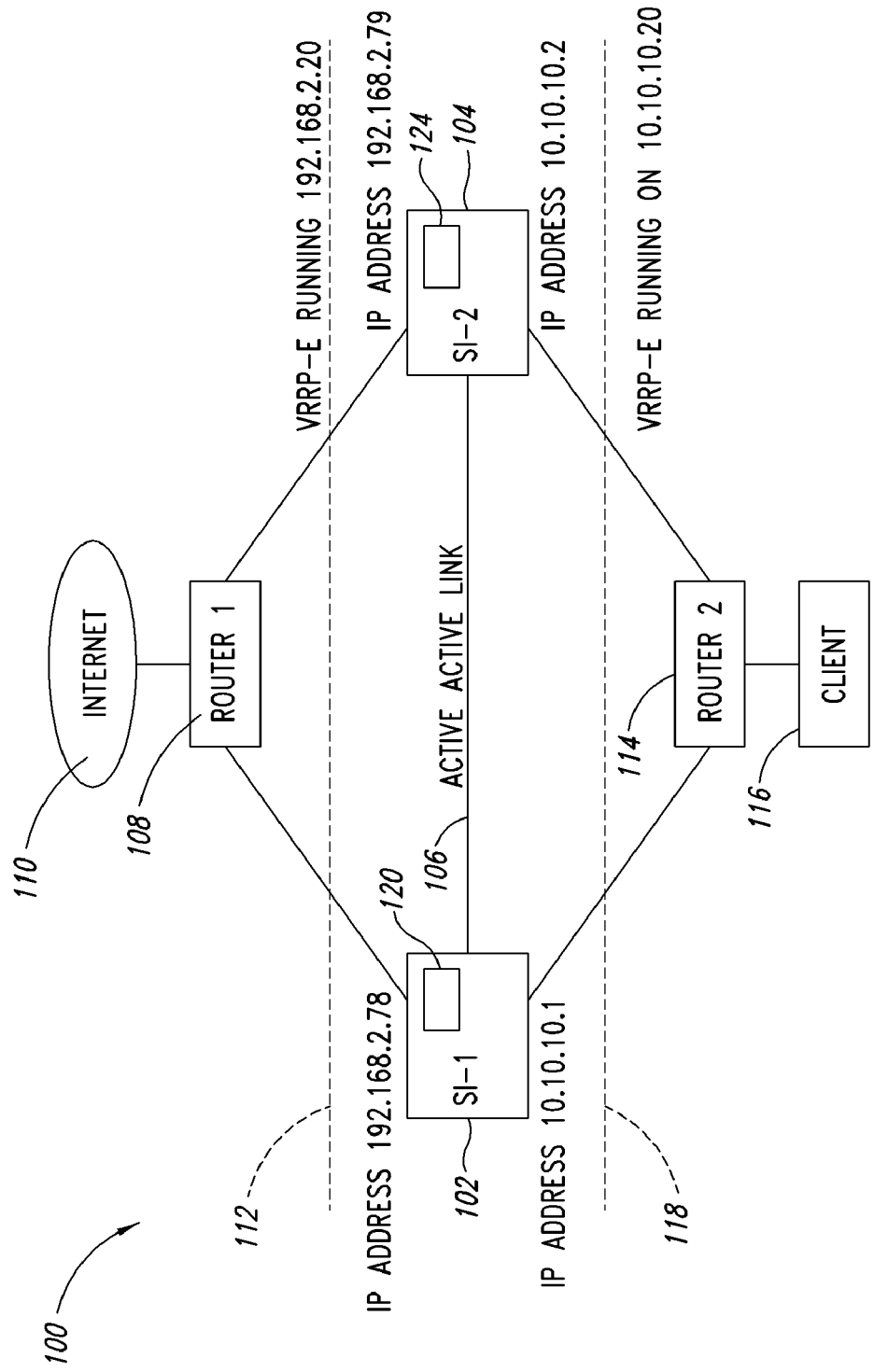
FIG. 1 illustrates a system that provides redundancy support for NAT in accordance with one embodiment of the invention.

Embodiments of techniques to provide redundancy support for NAT systems, TCS systems, or other types of applicable systems are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, one embodiment of the invention provides "stateful failover" (sometimes referred to as "hot failover") redundancy support for NAT. A master NAT device is backed-up with at least one back-up NAT device. Existing sessions are synchronized between the two NAT devices, such as via a dedicated link between them. In the event of a failure where the master NAT device goes down or is otherwise unable to perform its NAT functions, ownership of IP addresses is transferred from the master NAT device to the back-up NAT device. The back-up NAT device, which is now owner of the IP addresses, assumes the NAT functionality associated with these IP addresses and continues the existing sessions, as well as processing new sessions. Thus and in contrast to cold failovers, the hot failover redundancy support provided by one embodiment of the invention does not drop existing connections.

In an embodiment, the two NAT devices are coupled to provide "active-active" redundancy support. That is, even though one of them may be the master NAT device for performing all or most of the address translation and also forwarding traffic, the back-up NAT device may also be performing some address translation and/or forwarding its own traffic, as well as receiving session synchronization information from the master NAT device. In other embodiments, "active-standby" redundancy support is provided, where the back-up NAT device is not forwarding its own traffic while the master NAT device is active, but may still be receiving the session synchronization information.

One embodiment of the invention provides redundancy support for NAT using techniques based on protocols related to Virtual Router Redundancy Protocol (VRRP). For example, an embodiment of the invention may be implemented by applying VRRP-Extended (VRRP-e), used by Foundry Networks, Inc. of San Jose, Ca. to NAT. Additional information about VRRP-e may be found at Foundry Enterprise Configuration and Management Guide, "Configuring VRRP and VRRPE," Chapter 13, copyright 2002. In contrast to VRRP, VRRP-e does not use owners—there all routers are backups for a given IP address—the router with the highest priority becomes master and its back-up will respond to communications to that IP address if the master goes down. Moreover with VRRP, the virtual IP address is also a real IP address of an interface/port—with VRRP-e, the virtual IP address is not a real IP address configured on the interface (e.g., the virtual IP address is not bound to a particular interface).

When VRRP-e is defined on an IP address used by two NAT devices, the two NAT devices share the same virtual Media Access Control (MAC) address for that IP address. However, only one of the NAT devices owns the virtual MAC address at any point in time. The NAT device with the higher priority (e.g., the master or primary NAT device) owns the MAC address, and keeps sending communication messages to its peer(s) (e.g., the back-up or secondary NAT device) to indicate that it is still "alive," in addition to sending the session synchronization information. When the master NAT device goes down, the back-up NAT device detects the gap or other interruption in the communication and takes ownership of the MAC address, and starts forwarding traffic destined for that address.

Embodiments of the invention will be described herein in the context of NAT implementations. It is to be appreciated that other embodiments of the invention may be implemented for TCS or other types systems that use virtual addressing where stateful failover redundancy support is desired.

FIG. 1 illustrates a system 100 that provides redundancy support for NAT in accordance with one embodiment of the invention. In FIG. 1, various IP addresses are indicated. It is appreciated that these IP addresses are used merely for illustrative purposes to explain operation of an embodiment of the invention, and are not intended to restrict the scope of the invention to the specific addresses shown.

The system 100 includes at least two NAT devices 102 and 104. The NAT devices 102 and 104 can comprise Layer 3 routers, switches, or other type of network device (or combination thereof) that are suitable for performing NAT operations to translate addresses. The ServerIron® (SI) switch product provided by Foundry Networks, Inc. of San Jose, Ca. is one example of a device that can be used for the NAT devices 102 and 104 (respectively indicated as SI-1 and SI-2 in FIG. 1).

The NAT devices 102 and 104 are communicatively coupled to one or more outside routers 108 (indicated as "Router 1" in FIG. 1). The outside router 108 is in turn coupled to an Internet 110 or other outside network location.

The NAT device 102 is coupled to the outside router 108 via its outside port having an IP address of 192.168.2.78, for example. Similarly, the
NAT device 104 is coupled to the outside router 108 via its outside port having an IP address of 192.168.2.79, for example. However, with VRRP-e, these outside port IP addresses point to a virtual IP address that belongs to a pool of global virtual IP addresses (collectively referred to herein as "NAT addresses"), with 192.168.20 being the base address in the pool (indicated symbolically by a broken line 112 in FIG. 1). The NAT addresses in the pool are the global outside IP addresses to which the internal IP addresses are translated. Thus, packets sent to the outside router 108 from either the NAT device 102 or the NAT device 104 will have a NAT address from the pool as the source address, and return packets sent from the outside router 108 will have that NAT address as the destination address (and will in turn be received by the NAT device that currently owns that virtual IP address, to be translated back into the appropriate internal IP address).

For the inside ports, the NAT device 102 has an example IP address of 10.10.10.1, and the NAT device 104 has an example IP address of 10.10.10.2. These inside ports are coupled to an inside router 114 (indicated as "Router 2" in FIG. 2). The inside router 114 is in turn communicatively coupled to one or more clients 116, which may be servers, hosts, personal computers (PCs), switches, workstations, and the like.

With VRRP-e, these inside port IP addresses are mapped to a virtual IP address that belongs to a list of virtual IP addresses, with 10.10.10.20 being one of the virtual addresses in the list (indicated symbolically by a broken line 118 in FIG. 1) that is shared by both NAT devices 102 and 104. Thus, packets from the inside router 114 will be sent to 10.10.10.20, which will then be received by the NAT device 102 or 104 that currently owns that address.

To further illustrate configuration of NAT addresses for active-active redundancy support, the following configuration operations may be performed. It is appreciated that the format and content of these configuration operations will vary from one implementation to another, and are not intended to be restrictive of the invention.

SI-1(config)# ip nat inside source list 1 pool test
SI-1(config)# ip nat pool test 192.168.2.20 192.168.2.70 prefix-length 24
SI-1(config)# access-list 1 permit 10.10.10.0/24
SI-1(config-if-1/1)# ip address 10.10.10.1/24
SI-1(config-if-1/1)# ip nat inside
SI-1(config-if-1/10)# ip address 92.168.2.78/24
SI-1(config-if-1/10)# ip nat outside The "ip nat inside source list 1 pool test" command specifies that any packet having an address belonging to "list 1" should be translated to one of the addresses belonging to "pool test." The pool test addresses are the global NAT outside IP addresses, which in this example are the IP addresses in the range from 192.168.2.20 to 192.168.2.70 specified in the second configuration command above. The list 1 addresses are the inside IP addresses in the range 10.10.10.1 to 10.10.10.255 specified above. The configuration commands above also designate 10.10.10.1 as the inside address of the NAT device 102 that is to receive traffic from the inside router 114, and 192.168.2.78 as the outside address of the NAT device 102 that is to receive traffic from the outside router 108.

Such configuration operations may be performed on both the NAT devices 102 and 104 (e.g., both NAT devices should run the same configuration in one embodiment). Therefore, the IP addresses of the ports of both the NAT devices 102 and 104 will be different, but they will run VRRP-e on the same IP addresses, which in this case are 10.10.10.20 (on the inside port or interface) and 192.168.2.20 (the base address of the NAT pool). VRRP-e need not be run on the IP addresses of the outside ports 192.168.2.78 and 192.168.2.79.

The following configuration commands may be used to configure VRRP-e for inside source static NAT. That is, these configuration commands may be used to provide redundancy support for a single NAT IP address that is statically mapped to a single inside source IP address. It is noted that the addresses indicated in these configuration commands do not necessarily pertain to FIG. 1, and are instead intended to provide illustrative examples.

ServerIron(config)# ip nat inside source static 10.10.10.10 192.168.2.78
ServerIron(config)#int e 1/1
ServerIron(config-if-e100-1/1)#ip address 192.168.2.79/24
ServerIron(config-if-e100-1/1)# ip vrrp-extended vrid 1
ServerIron(config-if-e100-1/1)# backup
ServerIron(config-if-e100-1/1)# ip address 192.168.2.78
ServerIron(config-if-e100-1/1)# activate The first line of the configuration command specifies a 1 to 1 mapping (or translation) from an inside address of 10.10.10.10, which is the source of a packet, to a NAT address of 192.168.2.78. The subsequent lines of configuration commands configure VRRP-e for the IP address 192.168.2.78. The "backup" command allows application of VRRP-e where there is no "owner" of an IP address, and therefore, both the devices 102 and 104 are configured as backup for that IP address. The master is decided based on the priority that can be assigned.

Another set of configuration commands can include the following:
ServerIron(config)# ip nat inside source list 1 pool test
ServerIron(config)# ip nat pool test 192.168.2.20 192.168.2.40 pre 24
ServerIron(config))#int e 1/1
ServerIron(config-if-e100-1/1)# ip address 192.168.2.79/24
ServerIron(config-if-e100-1/1)# ip vrrp-extended vrid 1
ServerIron(config-if-e100-1/1)# backup
ServerIron(config-if-e100-1/1)# ip address 192.168.2.20
ServerIron(config-if-e100-1/1)# activate For inside destination static NAT, where there is a 1 to 1 static mapping of an outside NAT address to an inside destination address that is to receive a return packet, the configuration commands are similar to the above. Except, however, the "ip nat inside source static" command is replaced with an "ip nat inside destination static" command. VRRP-e is configured similarly for the NAT address 192.168.2.78.

For implementations where the NAT addresses belong to a pool, VRRP-e is configured for the base address. For example for inside source dynamic NAT, the following configuration commands may be used:
ServerIron(config)# ip nat inside source list 1 pool test.
ServerIron(config)# ip nat pool test 192.168.2.1 192.168.2.40 prefix-length 24

The first configuration command above defines the mapping of one of the inside addresses to any one of the NAT addresses in the pool. The second configuration command defines the NAT pool, where 192.168.2.1 is the base address in the pool. Therefore, one embodiment of the invention applies configuring redundancy support for only this base address 192.168.2.1, and in so doing, also provides redundancy support for other addresses in its pool that have the subnet address of 192.168.2. That is, one embodiment of the invention need not configure VRRP-e for every address in the pool—rather, VRRP-e is applied to the base address in the pool, and in the event of a failure affecting any address in the pool, that address is identified as belonging to the pool and failover support can be provided from the back-up NAT device that has been associated to the base address.

The following configuration commands are used for inside destination dynamic NAT.
(ServerIron)#ip nat inside destination list 1 pool test.
(ServerIron)#access-list 1 permit 192.168.2.0/24.

For inside destination dynamic NAT, incoming connections from the router 108 are made to an IP address belonging to the "access list." This destination IP address is then translated to an internal address specified in the pool. For example, if a connection is initiated to the IP address 192.168.2.30 (which is contained in the access-list 1), this destination IP address is translated to one of the addresses belonging to "pool test." As for VRRP-e, VRRP-e has to be configured on any address belonging to the access-list 1 (e.g., 192.168.2.30). This will ensure redundancy support for all the IP addresses belonging to access-list 1.

Referring back to FIG. 1, a communication link 106 is coupled to ports of the NAT devices 102 and 104. The communication link 106 may be hardwired or wireless. In an embodiment, the communication link 106 carries both session synchronization information and communication messages that indicate that the master NAT device is "alive." That is, assuming for illustrative purposes that the NAT device 102 is the active master NAT device and that the NAT device 104 is the back up, the NAT device 102 sends its current session information and "alive" communication messages to the NAT device 104 via the communication link 106. In one embodiment, both of these types of messages exchanged between the NAT devices 102 and 104 can comprise Layer 3 packets.

The ports of the NAT devices 102 and 104 that are coupled to the communication link 106 may be configured as "server active-active ports," such as if ServerIron® devices are used. The purpose of this or other similar configuration is to identify, for the software, the ports that are to send and receive session synchronization information. In an embodiment, the "alive" communication messages are not sent via the communication link 106, and are instead sent out via some other connection(s). In an alternative embodiment, the "alive" messages may be sent via the communication link 106. Additional information regarding active-active port configuration for ServerIron® devices are described in further detail in Foundry ServerIron® Switch Installation and Configuration Guide, "Configuring Symmetric SLB and SwitchBack," Chapter 7, copyright 2000, as well as in other available Foundry Networks documentation, all of which are incorporated herein by reference.

In an embodiment, the ports of the NAT devices 102 and 104 that are coupled to the communication link 106 belong to a separate virtual local area network (VLAN) than that used for network traffic. By placing the communication link 106 on a separate VLAN, the communication link 106 is placed on a separate Layer 2 broadcast domain, thereby avoiding undesirable Layer 2 loops with other links that carry network traffic.

In another embodiment, the devices 102 and 104 can comprise transparent cache switching (TCS) devices. The communication link 106 can allow both TCS devices to share the same cached data. If the master TCS device fails, the back-up TCS device can take over the sessions currently being handled by the master TCS device, since the back-up TCS device has the same cached data. Also, the addresses owned by the master TCS device is transferred to the back-up TCS device, so that all future traffic related to these addresses can be processed by the back-up TCS device for caching, fetching, forwarding, or other operation.

Figure 2:
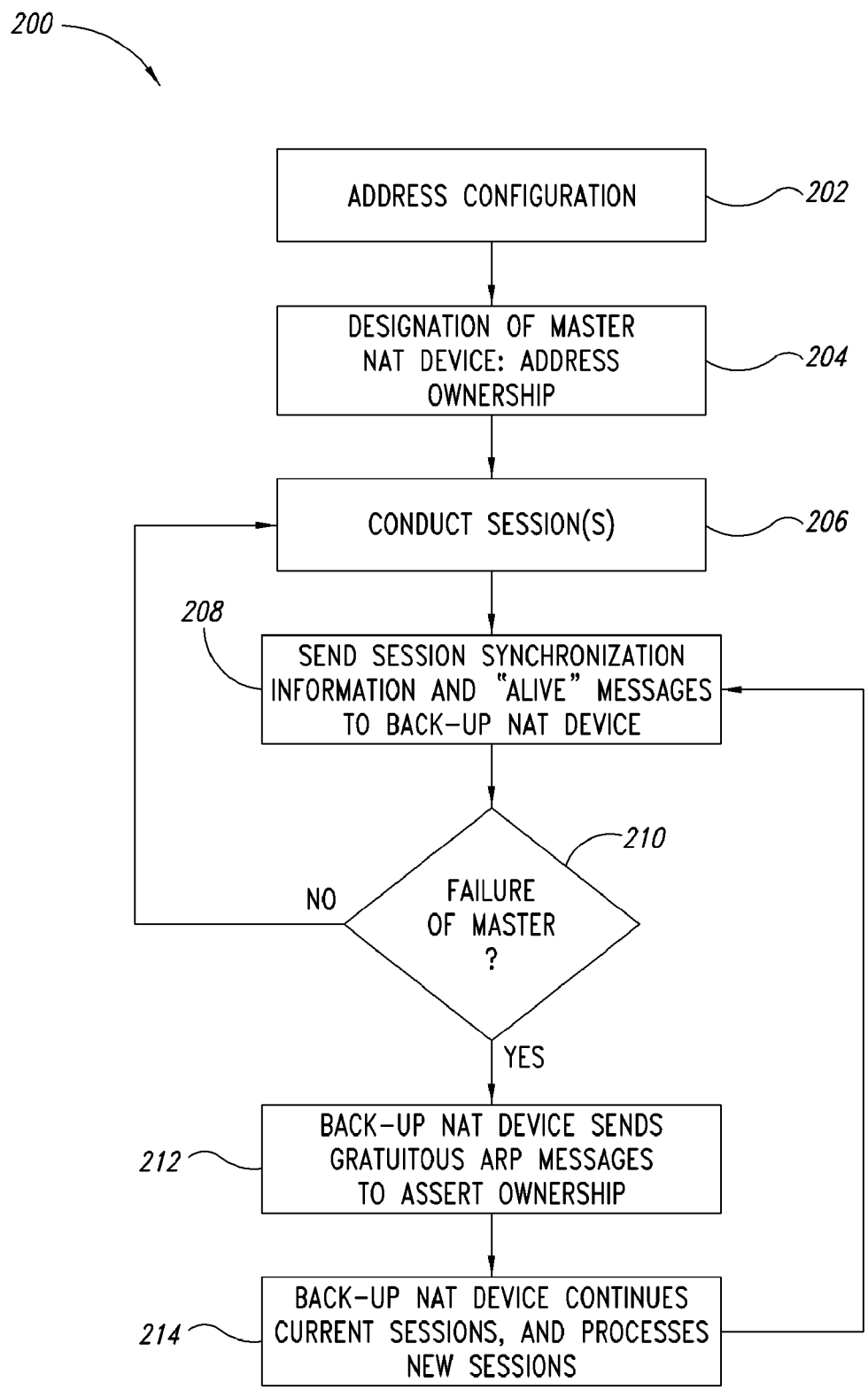
FIG. 2 is a flow chart illustrating operations associated with providing redundancy support for NAT in accordance with one embodiment of the invention.

Operation of the system 100 of FIG. 1 can be further understood by referring next to FIG. 2. FIG. 2 is a flow chart 200 illustrating operations associated with providing redundancy support for NAT in accordance with one embodiment of the invention. At least some of the elements of the flow chart 200 may be embodied in software or other machine-readable instruction stored on a machine-readable medium, such as at the NAT devices 102 and 104. For example, FIG. 1 shows a medium 120 and a medium 124, to store said instructions (such as software) to perform the various operations described herein, respectively at the NAT devices 102 and 104. Moreover, some of the operations depicted in the flow chart 200 need not necessarily occur in the exact sequence shown, and may be combined in some instances instead of being separate operations.

Beginning at a block 202, address configuration is performed to provide redundancy support for the NAT addresses. Such configuration may be performed using the example configuration commands explained above, in one embodiment. In general and as explained above, the configuration is performed to resolve address ownership in the event of a failover. For instance, if there is a pool of NAT addresses, the base address is associated to a back-up NAT device during the configuration, and if there is a failover involving any of the IP addresses in the same pool, such IP address(es) are "hooked" to the back-up NAT device by way of the base address. The back-up NAT device can thus perform address translation to and from this IP address, and can also forward traffic associated with this IP address.

At a block 204, the master NAT device is designated. This designation as the master gives that NAT device initial ownership over the NAT address pool and ownership over the virtual IP address(es) for the inside interfaces/ports that communicate with the inside router 114. The back-up NAT device shares, but does not own, these addresses at this point in time. According to one embodiment, the designation of the master can be performed using priority determination schemes that would be familiar to those skilled in the art having the benefit of this disclosure.

At a block 206, sessions are conducted (e.g., the master NAT device forwards traffic). In an active-active configuration, the back-up NAT device is also forwarding its own traffic at the block 206. In an active-standby configuration, the back-up NAT device does not forward traffic.

Concurrently with conducting the sessions at the block 206, the master NAT device sends session synchronization information to the back-up NAT device via the communication link 106. To briefly describe the session information, a session is created in software by the master NAT device each time the client 116 attempts to access an outside destination, such as the Internet 110. The session information logs the destination addresses and other data, which is used in connection with translating the forward and reply traffic and for carrying out further translation. By providing this session information to the back-up NAT device, the back-up NAT device can continue the same sessions in the event of a failover, or can use the session information where asymmetric routing is involved (e.g., the master NAT device forwards outgoing packets and the back-up NAT device receives incoming reply packets).

The session synchronization information may be generated dynamically or "on-demand" whenever new sessions are started. Alternatively or in addition, the session synchronization information may be generated on a scheduled periodic basis.

In addition at the block 208, the master NAT device sends communication messages to the back-up NAT device indicating that it is still "alive" or otherwise active and performing properly (e.g., a type of "heart beat" message or other message indicative of the status of the master NAT device). The heart beat messages may be sent once every second, for instance, or based on some other time interval.

At a block 210, the back-up NAT device monitors for failure of the master NAT device. An event indicative of a failure may be, for instance, a pronounced lapse of time when the heart beat messages are not received from the master NAT device. If the heart beat messages are detected with normal regularity at the block 210 (indicating that there is no failure of the master NAT device), then the process continues as normal at the blocks 206 and 208.

If the back-up NAT device detects a failure of the master NAT device at the block 210, however, then the back-up NAT device asserts itself as the new master at a block 212. In one embodiment, the back-up NAT device becomes the master by asserting ownership over the addresses that were owned by the master NAT device. Asserting ownership involves, in one embodiment, having the back-up NAT device send one or more messages to all of its peers to notify them that it now owns the addresses and that it is to receive all traffic destined for these addresses. In an example embodiment, the messages sent by the back-up NAT device comprise gratuitous address resolution protocol (ARP) messages that are sent to all of the peers (such as hosts) connected to the same Layer 2 domain.

Thereafter at a block 214, the back-up NAT device continues to forward traffic for current sessions that it inherited from the master NAT device, and also forwards or otherwise processes packets for new sessions. For sessions that were being handled by the former master NAT device, the back-up NAT device uses the session information to synchronize into these sessions, thereby allowing the back-up NAT device to transparently "pick up" and continue these on-going sessions.

In an embodiment with multiple levels of redundancy, the back-up NAT device (now the master) can also send session synchronization information or heart beat messages to yet another back-up NAT device (including the original master, if it has come back online) at the block 208. This ensures that if the back-up NAT device itself experiences a failover, the sessions and addresses can be transferred to a suitable back up.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
   associating, to a first network device, a base address corresponding to a first pool of addresses that are not owned by the first network device;
   receiving, by the first network device while the first network device does not own the first pool of addresses, session synchronization information on a separate virtual local area network (VLAN) connection different from a VLAN connection used to carry traffic;
   translating at least one address in a second pool of addresses from an inside network address to an outside network address; and
   detecting, by the first network device, a failure of a second network device; and asserting ownership, by the first network device, of a plurality of the first pool of addresses corresponding to the base address, in response to detection by the first network device of the failure.

2. The method of claim 1, wherein asserting ownership of the plurality of the first pool of addresses corresponding to the base address comprises asserting ownership, by the first network device, of all of the first addresses of the first pool of addresses corresponding to the base address.

3. The method of claim 1, further comprising: performing network address translation (NAT) or routing, by the first network device, by translating a plurality of the first pool of addresses from an outside address to an inside address.

4. The method of claim 1, further comprising: performing network address translation (NAT) or routing, by the first network device, by translating a plurality of the second pool of addresses from an outside address to an inside address.

5. The method of claim 1, further comprising: receiving, by the first network device from the second network device, heartbeat messages on a separate virtual local area network (VLAN) connection different from a VLAN connection used to carry traffic.

6. The method of claim 1, further comprising: sending a notification message, by the first network device to at least one peer device, that the first network device owns the first pool of addresses.

7. The method of claim 1, wherein the first network device comprises a switch or a router.

8. An apparatus, comprising:
   a first network device configurable to be associated with a base address corresponding to a first pool of addresses that are not owned by the first network device, wherein the first network device is further configurable to:
   receive, while the first network device does not own the first pool of addresses, session synchronization information on a separate virtual local area network (VLAN) connection different from a VLAN connection used to carry traffic;
   translate at least one address in a second pool of addresses from an inside network address to an outside network address;
   detect a failure of a second network device; and
   assert ownership of a plurality of the first pool of addresses corresponding to the base address, in response to detection of the failure.

9. The apparatus of claim 8, wherein the first network device is configurable to assert ownership of all of the first pool of addresses corresponding to the base address.

10. The apparatus of claim 8, wherein the first network device comprises a switch.

11. The apparatus of claim 8, wherein the first network device is further configured to perform network address translation (NAT) or routing by translating a plurality of the first pool of addresses from an outside address to an inside address.

12. The first network device of claim 8, wherein the first network device is further configured to perform network address translation (NAT) or routing by translating a plurality of the second pool of addresses from an outside address to an inside address.

13. The first network device of claim 8, wherein the first network device is configured to receive, from the second network device, heartbeat messages on a separate virtual local area network (VLAN) connection different from a VLAN connection used to carry traffic.

14. A system comprising:
    a first network device configurable to be associated with a base address corresponding to a first pool of addresses that are net owned by said first network device, wherein the first network device is further configurable to:
    translate at least one address in the first pool of addresses from an inside network address to and an outside network address;
    send, to a second network device, while the first network device owns the first pool of addresses, session synchronization information on a separate virtual local area network (VLAN) connection different from a VLAN connection used to carry traffic; and
    relinquish ownership of the first pool of addresses to the second network device upon failure of the first network device.

15. The system of claim 14, wherein the first and second network devices each comprise a switch.

16. The system of claim 14, wherein the second network device is further configurable to, while the second network device does not own the first pool of addresses, perform network address translation (NAT) or routing for a second pool of addresses.

17. The system of claim 14 wherein the second network device is further configurable to receive, from the second first network device, heartbeat messages while the second network device does not own the first pool of addresses, wherein the heartbeat messages are received on a separate virtual local area network (VLAN) connection different from a VLAN connection used to carry traffic.

18. The system of claim 14, wherein, the second network device is configurable to send a message to at least one peer network device configured to provide notification that the second network device is a new master device that owns the plurality of the first pool of addresses corresponding to the base address.

19. The system of claim 18, wherein the message notification is a gratuitous address resolution protocol (ARP) message.

20. The system of claim 14, wherein the second network device is configurable to assert ownership of all of the first pool of addresses corresponding to the base address.

21. A first device configured to:
    own a base address corresponding to a first pool of addresses associated to and owned by a second device;

assert ownership of a plurality of the first pool of addresses in response to failure of the second device with respect to translating any of the first pool of addresses; and translate at least one address in a second pool of addresses from an inside network address to and an outside network address, wherein the first device comprises:
  a first port configured to receive traffic; and
  a second port configured to receive, from the second device, session synchronization information on a separate virtual local area network (VLAN) connection different from a VLAN connection used to carry traffic.

22. The first device of claim 21, further configured to assert ownership of all of the first pool of addresses.

23. The apparatus first device of claim 21, further comprising a switch or a router.

24. The first device of claim 21, wherein the first device is further configured to perform network address translation (NAT) or routing by translating a plurality of the first pool of addresses from an outside address to an inside address.

25. The first device of claim 21, wherein the first network device is configured to send, to the second network device, heartbeat messages on a separate virtual local area network (VLAN) connection different from a VLAN connection used to carry traffic.

* * * * *